US010214445B2

(12) United States Patent
Hart et al.

(10) Patent No.: US 10,214,445 B2
(45) Date of Patent: Feb. 26, 2019

(54) ARTICLES WITH PATTERNED COATINGS

(71) Applicant: Corning Incorporated, Corning, NY (US)

(72) Inventors: Shandon Dee Hart, Corning, NY (US); Guangli Hu, Berkeley Heights, NJ (US); Nicholas James Smith, State College, PA (US)

(73) Assignee: CORNING INCORPORATED, Corning, NY (US)

( * ) Notice: Subject to any disclaimer, the term of this patent is extended or adjusted under 35 U.S.C. 154(b) by 100 days.

(21) Appl. No.: 15/128,004

(22) PCT Filed: Mar. 17, 2015

(86) PCT No.: PCT/US2015/020950
§ 371 (c)(1),
(2) Date: Sep. 21, 2016

(87) PCT Pub. No.: WO2015/142837
PCT Pub. Date: Sep. 24, 2015

(65) Prior Publication Data
US 2017/0217831 A1    Aug. 3, 2017

Related U.S. Application Data

(60) Provisional application No. 61/977,688, filed on Apr. 10, 2014, provisional application No. 61/968,519, filed on Mar. 21, 2014.

(51) Int. Cl.
*B32B 3/00* (2006.01)
*C03C 17/00* (2006.01)
(Continued)

(52) U.S. Cl.
CPC .......... *C03C 17/007* (2013.01); *C01B 33/18* (2013.01); *C01G 19/006* (2013.01); *C03C 3/091* (2013.01);
(Continued)

(58) Field of Classification Search
None
See application file for complete search history.

(56) References Cited

U.S. PATENT DOCUMENTS 3,860,478 A    1/1975  Bartlow et al.
4,057,408 A    11/1977 Pierson et al.
(Continued)

FOREIGN PATENT DOCUMENTS

EP    0838723 A1    4/1998
JP    04392127 B2    12/2009
(Continued)

OTHER PUBLICATIONS

Lyashenko et al, "On the Reduction of Residual Stresses in Plasma-Vacuum-Deposited Coatings", Strength of Materials, Jul. 2001, vol. 33, Issue 4, pp. 344-348.
(Continued)

*Primary Examiner* — Seth Dumbris
(74) *Attorney, Agent, or Firm* — Shantanu C. Pathak

(57) ABSTRACT

Embodiments of an article including a substrate and a patterned coating are provided. In one or more embodiments, when a strain is applied to the article, the article exhibits a failure strain of 0.5% or greater. Patterned coating may include a particulate coating or may include a discontinuous coating. The patterned coating of some embodiments may cover about 20% to about 75% of the surface area of the substrate. Methods for forming such articles are also provided.

15 Claims, 11 Drawing Sheets

(51) Int. Cl.
  *C03C 17/23* (2006.01)
  *C03C 17/245* (2006.01)
  *C01B 33/18* (2006.01)
  *C01G 19/00* (2006.01)
  *C03C 3/091* (2006.01)
  *C03C 3/093* (2006.01)
  *C03C 4/18* (2006.01)
  *C09D 1/00* (2006.01)
  *C09D 1/02* (2006.01)
  *C03C 17/36* (2006.01)

(52) U.S. Cl.
  CPC ........... C03C 3/093 (2013.01); C03C 4/18 (2013.01); C03C 17/006 (2013.01); C03C 17/23 (2013.01); C03C 17/2453 (2013.01); C03C 17/3657 (2013.01); C09D 1/00 (2013.01); C09D 1/02 (2013.01); *C03C 2204/00* (2013.01); *C03C 2217/213* (2013.01); *C03C 2217/231* (2013.01); *C03C 2217/42* (2013.01); *C03C 2217/43* (2013.01); *C03C 2217/478* (2013.01); *C03C 2217/732* (2013.01); *C03C 2217/78* (2013.01); *C03C 2217/948* (2013.01); *C03C 2218/154* (2013.01); *C03C 2218/328* (2013.01); *C03C 2218/34* (2013.01); *Y10T 428/24917* (2015.01); *Y10T 428/24926* (2015.01)

(56) References Cited

U.S. PATENT DOCUMENTS

| | | | |
|---|---|---|---|
| 4,130,680 A | 12/1978 | Ference et al. | |
| 5,254,202 A * | 10/1993 | Kaplan | C04B 41/009 156/345.1 |
| 5,364,685 A * | 11/1994 | Nakashima | B32B 17/10036 296/84.1 |
| 6,090,446 A | 7/2000 | Nakashima et al. | |
| 6,379,569 B1 | 4/2002 | Rouberol | |
| 6,861,136 B2 | 3/2005 | Verlinden et al. | |
| 6,919,162 B1 * | 7/2005 | Brennen | B23K 26/0084 219/121.66 |
| 6,983,768 B1 | 1/2006 | Vujic | |
| 7,678,440 B1 | 3/2010 | McKnight et al. | |
| 2004/0071960 A1 | 4/2004 | Weber et al. | |
| 2005/0266262 A1 * | 12/2005 | Bonhote | G11B 5/855 428/621 |
| 2009/0197048 A1 | 8/2009 | Amin et al. | |
| 2010/0047466 A1 | 2/2010 | Buck et al. | |
| 2011/0045209 A1 | 2/2011 | Seleznev | |
| 2012/0052252 A1 | 3/2012 | Kohli et al. | |
| 2012/0187435 A1 | 7/2012 | Gy et al. | |
| 2012/0231212 A1 | 9/2012 | Leib et al. | |
| 2012/0281292 A1 | 11/2012 | Baca et al. | |
| 2015/0079398 A1 * | 3/2015 | Amin | C01B 21/068 428/408 |

FOREIGN PATENT DOCUMENTS

| | | |
|---|---|---|
| WO | 2009134448 A1 | 11/2009 |
| WO | 2013137176 A1 | 9/2013 |

OTHER PUBLICATIONS

Thornton, "Strengthening effects of discontinuous coatings on metal filaments", Metallurgical Transactions, Mar. 1972, vol. 3, Issue 3, pp. 637-645.

Oliver, W.C.; Pharr, G. M. "An improved technique for determining hardness and elastic modulus using load and displacement sensing indentation experiments", J. Mater. Res., vol. 7, No. 6, 1992, 1564-1583.

Oliver, W.C.; Pharr, G.M. Measurement of Hardness and Elastic Modulus by Instrument Indentation: Advances in Understanding and Refinements to Methodology. J. Mater. Res., vol. 19, No. 1, Mar. 20, 2004.

English Translation of CN201580014827.0 Office Action dated Jun. 26, 2018; 9 Pages; Chinese Patent Office.

* cited by examiner

ARTICLES WITH PATTERNED COATINGS

CROSS-REFERENCE TO RELATED APPLICATIONS

This application claims the benefit of priority under 35 U.S.C. § 371 of International Patent Application Serial No. PCT/US15/20950 filed on Mar. 17, 2015, which in turn, claims the benefit of priority of U.S. Provisional Patent Application Ser. No. 61/977,688 filed on Apr. 10, 2014 and U.S. Provisional Patent Application Ser. No. 61/968,519 filed on Mar. 21, 2014, the contents of each of which are relied upon and incorporated herein by reference in their entireties.

BACKGROUND

The disclosure relates to articles with retained strength, and more particularly to articles including a substrate and a patterned coating disposed on a surface of the substrate and methods of forming such articles.

Articles including substrates such as glass substrates, which may be strengthened or strong as described herein, have found wide usage recently as a protective cover glass for displays, especially in touch-screen applications, and there is a potential for its use in many other applications, such as automotive or architectural windows and glass for photovoltaic systems. In many of these applications it can be advantageous to apply a coating to the substrates. Exemplary coatings include indium-tin-oxide ("ITO") or other transparent conductive oxides (e.g., aluminum and gallium doped zinc oxides and fluorine doped tin oxide), hard coatings of various kinds (e.g., diamond-like carbon, $Al_2O_3$, AlN, AlOxNy, $Si_3N_4$, $SiO_xN_y$, $SiAl_xO_yN_z$ TiN, TiC), IR or UV reflecting layers, conducting or semiconducting layers, electronics layers, thin-film-transistor layers, or anti-reflection ("AR") coatings (e.g., $SiO_2$, $Nb_2O_5$ and $TiO_2$ layered structures). In many instances these coatings must necessarily be hard and brittle, or otherwise their other functional properties (e.g., mechanical, durability, electrical conductivity, optical properties) will be degraded. In most cases these coatings are thin films, that is, they generally have a thickness in the range of 0.005 µm to 10 µm (e.g., 5 nm to 10,000 nm).

When a coating is applied to a surface of such substrates, the average flexural strength of the substrate may be reduced, for example, when evaluated using ball-drop or ring-on-ring strength testing. This behavior has been measured to be independent of temperature effects (i.e., the behavior is not caused by significant or measureable relaxation of surface compressive stress in the strengthened glass substrate due to any heating). The reduction in average flexural strength is also apparently independent of any substrate surface damage or corrosion from processing, and is apparently an inherent mechanical attribute of the article, even when thin films having a thickness in the range from about 20 nm to about 200 nm are utilized in the article. In view of this new understanding, there is a need to prevent coatings from reducing the average flexural strength of substrates and articles including the same.

The embodiments of the articles described herein exhibit strength retention by preventing or suppressing crack formation in the coating by, for example, enhancing the intrinsic strain-to-failure of the coating and/or providing a mechanism of strain relief in the coating.

SUMMARY

A first aspect of this disclosure pertains to an article including a substrate with a surface and a patterned coating disposed on the surface forming a coated surface. In one or more embodiments, the when a strain is applied to the article, the article exhibits a failure strain of 0.5% or greater. In some embodiments, when a strain is applied to the article, the patterned coating has a first region and a second region, and wherein the first region comprises a first tensile stress and the second region comprises a second tensile stress greater than the first tensile stress. In some other embodiments, when a strain is applied to the article, the substrate comprises a maximum substrate tensile stress and the patterned coating has at least one local region comprising a local tensile stress that is less than the maximum substrate tensile stress. In yet other embodiments, when a strain is applied to the article, the substrate comprises a maximum substrate tensile strain and the patterned coating has at least one local region comprising a local tensile strain that is less than the maximum substrate tensile strain.

In one or more embodiments, the patterned coating includes a bimodal distribution of coating thickness, the bimodal distribution comprising a lower-mode thickness in the range from about 0 to about 100 nm, and a higher-mode thickness in the range from about 50 to about 5000 nm. The bimodal distribution of coating thickness may include a lower-mode thickness comprising a full-width-at half-maximum (FWHM) of about 1 nm or less and a higher-mode thickness comprising a FWHM greater than the FWHM of the lower mode thickness. In some embodiments, the FWHM of the higher-mode thickness is less than the difference in the surface topographical heights of the lower mode thickness and the higher mode thickness. In other embodiments, the patterned coating includes a bimodal distribution with a lower-mode thickness comprising a FWHM of about 1 nm or greater, and a higher-mode thickness comprising a FWHM greater than the FWHM of the lower mode thickness. In yet other embodiments, the FWHM of the higher-mode thickness is at most two times the difference in the surface topographical heights of the lower mode thickness and the higher mode thickness.

In one or more embodiments, the patterned coating includes a plurality of peaks and a plurality of valleys between the peaks. In one option, the plurality of valleys comprises a coating thickness of at least about 5 nm or at least about 10 nm.

The patterned coating may be disposed on a portion of the surface of the substrate. In one or more embodiments, the substrate surface has a surface area and the patterned coating covers at least about 20% of the surface area.

The patterned coating of one or more embodiments may exhibit a hardness of about 8 GPa or greater, measured by a Berkovich Indenter Hardness Test, as described herein, along an indentation depth of about 100 nm or greater (e.g., from about 100 nm to about 300 nm, from about 100 nm to about 400 nm, from about 100 nm to about 500 nm, or from about 100 nm to about 600 nm). In other instances, the patterned coating may exhibit in at least one region of the surface a scratch depth reduction of at least 10% and a scratch width reduction of at least 10% when compared to the substrate without the patterned coating. In some embodiments, the pattern exhibits a crack onset strain of about 0.5% or greater, when a strain is applied to the article.

The materials used to form the patterned coating may be varied and may include transparent conductive oxide. In one or more particular embodiments, the patterned coating may include a plurality of particles disposed on the surface of the substrate. In some embodiments, the plurality of particles may be disposed in a monolayer on the surface, wherein adjacent particles are separated from each other by a gap. In such embodiments, the surface having the patterned particulate coating has a reflectance of less than about 2% at wavelengths in a range from about 450 nm to about 1000 nm. The particles used in the patterned particulate coating may include silica particles. The patterned particulate coating may be disposed on about 20% or greater of the surface area of the surface of the substrate. In some cases, the patterned particulate coating may be disposed on up to about 75% of the surface area of the substrate surface.

The substrate of one or more embodiments exhibits an average strain-to-failure that is greater than an amount selected from 0.5%, 0.7%, 1.0%, 1.5%, 2%, 2.5% and 3%. In some instances, the substrate includes a strengthened glass substrate or a glass ceramic substrate.

In one or more embodiments, the article may exhibit an average flexural strength that is substantially the same as an average flexural strength of the substrate without the patterned coating. In other embodiments, the article may exhibit improved average flexural strength over substrates without the patterned coating. In one or more embodiments, the article exhibits an average reflectance of less than about 6% at wavelengths in a range from about 450 nm to about 1000 nm.

A second aspect of this disclosure pertains to a method of forming the articles described herein. In one or more embodiments, the method includes providing a substrate having a first major surface, selectively disposing a coating on the first major surface to form a patterned coating comprising a bimodal distribution of coating thickness. In one or more embodiments, when a strain is applied to the article, the bimodal distribution of coating thickness reduces the stress concentration in a local region of the patterned coating.

In one or more embodiments, selectively disposing the coating includes disposing a mask having at least one opening on the first major surface, and selectively disposing the coating on the mask. In some embodiments, selectively disposing the coating comprises disposing the coating on the first major surface and removing portions of the coating.

Additional features and advantages will be set forth in the detailed description which follows, and in part will be readily apparent to those skilled in the art from that description or recognized by practicing the embodiments as described in the following detailed description and claims, and the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
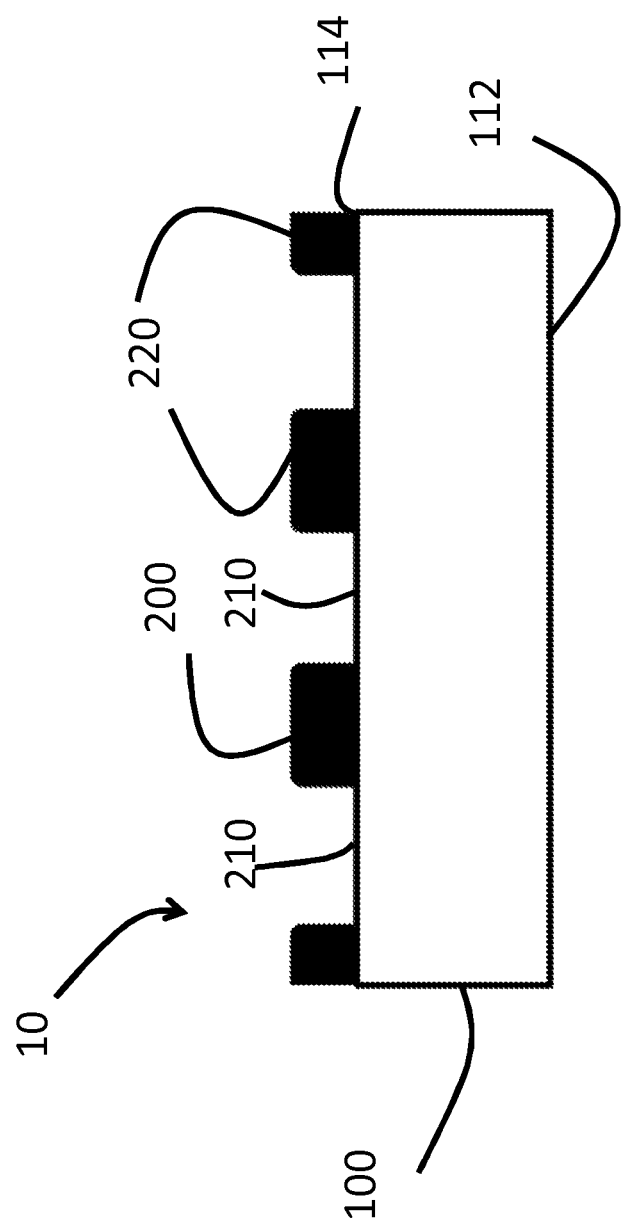
FIG. 1 is a an side-view illustration of an article according to one or more embodiments.

Reference will now be made in detail to various embodiment(s), examples of which are illustrated in the accompanying drawings. Whenever possible, the same reference numerals will be used throughout the drawings to refer to the same or like parts.

A first aspect of the present disclosure pertains to an article including a substrate with a surface and a patterned coating disposed on the surface forming a coated surface. As used herein, the term "dispose" includes coating, depositing and/or forming a material onto a surface using any known method in the art. The disposed material may constitute a coating, layer or film. The phrase "disposed on" includes the instance of forming a material onto a surface such that the material is in direct contact with the surface and also includes the instance where the material is formed on a surface, where one or more intervening material(s) is between the disposed material and the surface. The intervening material(s) may constitute a coating, layer or film, as defined herein. In one or more embodiments, the article exhibits a failure strain of 0.5% or greater. One exemplary article 10 having a substrate 100 and a patterned coating 200 is shown in FIG. 1.

Figure 2B:
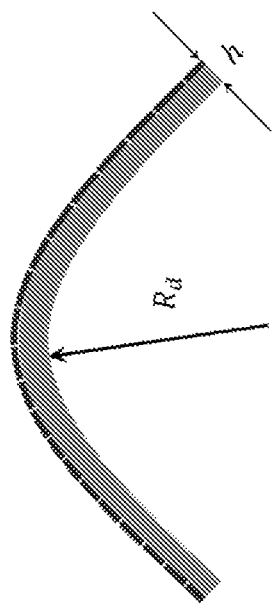
FIG. 2A-2B is a schematic of a strength retention mechanism exhibited by one or more embodiments of the present disclosure.
Figure 2A:
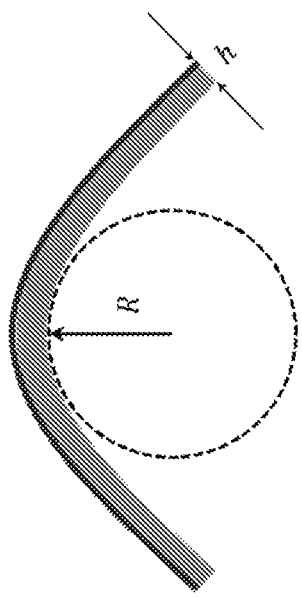
Figure 3C:
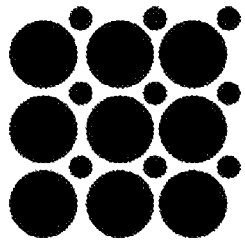
FIGS. 3A-3F are top view illustrations of exemplary patterned coatings, according to one or more embodiments.
Figure 3F:
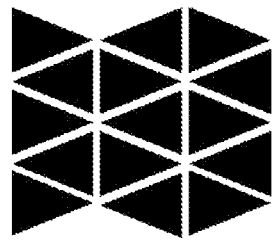
Figure 3B:
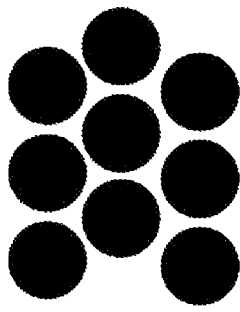
Figure 3E:
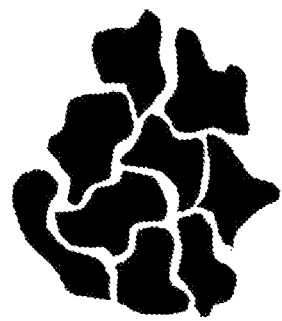
Figure 3A:
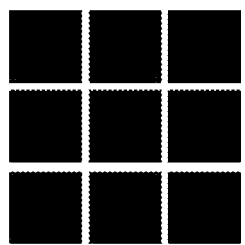
Figure 3D:
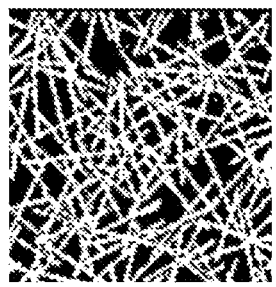

The patterned coating 200 described herein provides strength retention to the article to preserve the strength of the article 10 or the substrate 100 (after combination with the patterned coating 200). The resulting strength retention can be demonstrated by ring-on-ring testing of articles 10 that include the patterned coatings and substrates described herein. Without being bound by theory, it is believed that when macroscopic strain is applied to the article, the patterned coating reduces stress in the coating, i.e. the patterned structure provides a mechanism for "strain relief" in the patterned coating. This mechanism is illustrated in FIGS. 2A and 2B. In FIG. 2A, the strain on the non-patterned coating 250 is maximized at the center portion, where the radius of the curvature R is minimized at the center region. In FIG. 2B, the strain on the patterned coating 200 is maximized closed to the center portion, where the radius of the local curvature $R_d$ is larger than the global curvature R for the non-patterned coating 250. Thus, the maximum strain in the patterned coating 200 may be mitigated by the structure of the patterned coating. As such, during a loading event, the patterned coating would build stress much more slowly than a non-patterned coating. This reduction of stress correspondingly prevents the formation of strength-limiting flaws or cracks in the patterned coating. Without being bound by theory, such strength retention may also be caused by the patterned structure limiting lateral crack growth within the plane of the patterned coating.

In one or more embodiments, the patterned coating may provide the strength retention attributes described herein, while also providing other functional benefits. To accomplish both, the structure and/or properties of the patterned coating may be specifically tailored. For example, where scratch-resistance is desired, the patterned coating may be formed to provide peaks having a high fractional surface coverage (e.g., through the use of narrow valleys between the peaks). In such embodiments, valleys in the patterned coating may have blunt or flat cross-sectional profiles, so as to limit any potential tendency for these high-aspect-ratio features to act as stress-concentrators. Where contiguous conductivity is desired across the patterned coating (e.g. where the patterned coating is used to form touch sensors), the use of conductive interconnects between peaks may be employed.

In embodiments desiring certain optical characteristics (e.g. cover glasses used in consumer electronics devices), the use of sub-wavelength patterning methods may be utilized to form patterned coatings with very narrow valleys (e.g., valleys with dimensions below the wavelength of light, generally <500 nm), such that the valleys themselves are not resolved by the optical field and are not visible to the eye. In one or more embodiments, the use of periodic, pseudorandom, or aperiodic island shapes may be used to minimize optical interference effects such as diffraction, pixel moiré effects, etc. In yet other embodiments, gentle or graded transitions between the coated and nominally-uncoated regions of the patterned coating may also be used to make that interface less abrupt and render the patterned coating less visible to the eye.

In one or more embodiments, a variety of patterned coating structures may be envisioned. The exact design and scale of such structures may depend on desired application and production method, and can vary through parameters of interest such as peak size, valley size, surface coverage, periodicity/aperiodicity, etc. to achieve desired balance of properties. Exemplary patterned coatings are shown in FIGS. 3A-3F.

Substrate

Referring to FIG. 1, the article 10 includes a substrate 100, which may be glass. Such glass substrates may be strengthened or strong, as described herein. The substrate 100 includes opposing major surfaces 112, 114, and the patterned coating 200 is disposed on at least one opposing major surface (112 or 114). In one or more alternative embodiments, the patterned coating 200 may be disposed on the minor surface(s) of the substrate in addition to or instead of being disposed on at least one major surface (112 or 114). The substrate 100 may be substantially planar sheets, although other embodiments may utilize a curved or otherwise shaped or sculpted substrate. The substrate 100 may be substantially clear, transparent and free from light scattering. Where the substrate 100 includes a glass substrate, such substrate may have a refractive index in the range from about 1.45 to about 1.55.

In one or more embodiments, the glass substrate 100 may be strengthened or characterized as strong, as will be described in greater detail herein. The glass substrate 100 may be relatively pristine and flaw-free (for example, having a low number of surface flaws or an average surface flaw size less than about 1 micron) before such strengthening. Where strengthened or strong glass substrates 100 are utilized, such substrates may be characterized as having a high average flexural strength (when compared to glass substrates that are not strengthened or strong) or high surface strain-to-failure (when compared to glass substrates that are not strengthened or strong) on one or more major opposing surfaces of such substrates.

Additionally or alternatively, the thickness of the substrate 100 may vary along one or more of its dimensions for aesthetic and/or functional reasons. For example, the edges of the substrate 100 may be thicker as compared to more central regions of the substrate 100. The length, width and thickness dimensions of the substrate 100 may also vary according to the article 10 applications or use.

The substrate 100 according to one or more embodiments includes an average flexural strength that may be measured before and after the substrate 100 is combined with the patterned coating 200 and/or other films or layers. In one or more embodiments described herein, the article 10 retains its average flexural strength after the combination of the substrate 100 with the patterned coating 200 and/or other films, layers or materials, when compared to the average flexural strength of the substrate 100 before such combination. In other words, the average flexural strength of the article 10 is substantially the same before and after the patterned coating 200 and/or other films or layers are disposed on the substrate 100. In one or more embodiments, the article 10 has an average flexural strength that is significantly greater than the average flexural strength of a similar article that does not include the patterned coating 200.

In accordance with one or more embodiments, the glass substrate 100 has an average strain-to-failure that may be measured before and after the glass substrate 100 is combined with the patterned coating 200 and/or other films or layers. The term "average strain-to-failure" refers to the strain at which cracks propagate without application of additional load, typically leading to catastrophic failure in a given material, layer or film and, perhaps even bridging to another material, layer, or film, as defined herein. Average strain-to-failure may be measured using, for example, ring-on-ring or ball-on-ring testing. Without being bound by theory, the average strain-to-failure may be directly correlated to the average flexural strength using appropriate mathematical conversions. In specific embodiments, the glass substrate 100, which may be strengthened or strong as described herein, has an average strain-to-failure that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater. In specific embodiments, the glass substrate has an average strain-to-failure of 1.2%, 1.4%, 1.6%, 1.8%, 2.2%, 2.4%, 2.6%, 2.8% or 3% or greater. Without being bound by theory, it is believed that the average strain-to-failure of a glass substrate or any other material is dependent on the surface quality of such material. With respect to glass substrates, the average strain-to-failure of a specific glass substrate can be dependent on the conditions of ion exchange or strengthening process utilized in addition to or instead of the surface quality of the glass substrate.

Where glass substrates are utilized, such substrates may be provided using a variety of different processes. For instance, example glass substrate forming methods include float glass processes and down-draw processes such as fusion draw and slot draw.

In the float glass process, a glass substrate that may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that may possess relatively pristine surfaces. Because the average flexural strength of the glass substrate is controlled by the frequency, amount and/or size of surface flaws, a pristine surface that has had minimal contact has a higher initial strength. When this high strength glass substrate is then further strengthened (e.g., chemically), the resultant strength can be higher than that of a glass substrate with a surface that has been lapped and polished. Down-drawn glass substrates may be drawn to a thickness of less than about 2 mm. In addition, down drawn glass substrates may have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Once formed, glass substrates may be strengthened to form strengthened glass substrates. As used herein, the term "strengthened glass substrate" may refer to a glass substrate that has been chemically strengthened, for example through ion-exchange of larger ions for smaller ions in the surface of the glass substrate. However, other strengthening methods known in the art, such as thermal tempering, may be utilized to form strengthened glass substrates. As will be described, strengthened glass substrates may include a glass substrate having a surface compressive stress in its surface that aids in the strength preservation of the glass substrate. Strong glass substrates are also within the scope of this disclosure and include glass substrates that may not have undergone a specific strengthening process, and may not have a surface compressive stress, but are nevertheless strong. Such strong glass substrates articles may be defined as glass sheet articles or glass substrates having an average strain-to-failure greater than about 0.5%, 0.7%, 1%, 1.5%, or even greater than 2%. Such strong glass substrates can be made, for example, by protecting the pristine glass surfaces after melting and forming the glass substrate. An example of such protection occurs in a fusion draw method, where the surfaces of the glass films do not come into contact with any part of the apparatus or other surface after forming. The glass substrates formed from a fusion draw method derive their strength from their pristine surface quality. A pristine surface quality can also be achieved through etching or polishing and subsequent protection of glass substrate surfaces, and other methods known in the art. In one or more embodiments, both strengthened glass substrates and the strong glass substrates may have an average strain-to-failure greater than about 0.5%, 0.7%, 1%, 1.5%, 2%, 2.5% or even 3%, for example when measured using ring-on-ring or ball-on-ring flexural testing.

As mentioned above, the glass substrates described herein may be chemically strengthened by an ion exchange process or strengthened by providing mismatch in the coefficient of thermal expansion ("CTE") between a core glass and/or clad glass, which that generates compressive stress to provide a strengthened glass substrate 120. Strengthened glass substrates formed by CTE mismatch may be referred to as "CTE strengthened" glass substrates. The glass substrate may also be strengthened by other methods known in the art, such as thermal tempering. In the ion-exchange process, typically by immersion of the glass substrate into a molten salt bath for a predetermined period of time, ions at or near the surface(s) of the glass substrate are exchanged for larger metal ions from the salt bath. In one embodiment, the temperature of the molten salt bath is about 350° C. to 450° C. and the predetermined time period is about two to about eight hours. The incorporation of the larger ions into the glass substrate strengthens the glass substrate by creating a compressive stress in a near surface region or in regions at and adjacent to the surface(s) of the glass substrate. A corresponding tensile stress is induced within a central region or regions at a distance from the surface(s) of the glass substrate to balance the compressive stress. Glass substrates utilizing this strengthening process may be described more specifically as chemically-strengthened glass substrates 100 or ion-exchanged glass substrates 100. As mentioned herein, in CTE strengthened glass the coefficient of thermal expansion mismatch between core glass and clad glass (where generally core glass has a higher CTE), compressive stress can be generated on the clad layer during cooling, to strengthen the glass substrate. Glass substrates that are not strengthened may be referred to herein as non-strengthened glass substrates.

In one example, sodium ions in a strengthened glass substrate 100 are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, phosphates, halides, and the like may be used in the ion exchange process.

The replacement of smaller ions by larger ions at a temperature below that at which the glass network can relax produces a distribution of ions across the surface(s) of the strengthened glass substrate 100 that results in a stress profile. The larger volume of the incoming ion produces a compressive stress (CS) on the surface and tension (central tension, or CT) in the center of the strengthened glass substrate 100. Depth of exchange may be described as the depth within the strengthened glass substrate 100 (i.e., the distance from a surface of the glass substrate to a central region of the glass substrate), at which ion exchange facilitated by the ion exchange process takes place.

In one embodiment, a strengthened glass substrate 100 can have a surface compressive stress of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass substrate 100 may have a compressive depth of layer 15 μm or greater, 20 μm or greater (e.g., 25 μm, 30 μm, 35 μm, 40 μm, 45 μm, 50 μm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate 100 has one or more of the following: a surface compressive stress greater than 500 MPa, a depth of compressive layer greater than 15 μm, and a central tension greater than 18 MPa.

Without being bound by theory, it is believed that strengthened glass substrates 100 with a surface compressive stress greater than 500 MPa and a compressive depth of layer greater than about 15 μm typically have greater strain-to-failure than non-strengthened glass substrates (or, in other words, glass substrates that have not been ion exchanged or otherwise strengthened). In some embodiments, the benefits of one or more embodiments described herein may not be as prominent with non-strengthened or weakly strengthened types of glass substrates that do not meet these levels of surface compressive stress or compressive depth of layer, because of the presence of handling or common glass surface damage events in many typical applications. However, as mentioned previously, in other specific applications where the glass substrate surfaces can be adequately protected from scratches or surface damage (for example by a protective coating or other layers), strong glass substrates with a relatively high strain-to-failure can also be created through forming and protection of a pristine glass surface quality, using methods such as the fusion forming method. In these alternate applications, the benefits of one or more embodiments described herein can be similarly realized.

Example ion-exchangeable glasses that may be used in the strengthened glass substrate 100 may include alkali aluminosilicate glass compositions or alkali aluminoborosilicate glass compositions, though other glass compositions are contemplated. As used herein, "ion exchangeable" means that a glass substrate is capable of exchanging cations located at or near the surface of the glass substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass substrate 100 includes a glass composition with at least 6 wt. % aluminum oxide. In a further embodiment, a glass substrate 100 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the glass substrate 120 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass substrate 120, which may optionally be strengthened or strong, comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % ≤ $(Li_2O+Na_2O+K_2O)$ ≤ 20 mol. % and 0 mol. % ≤ (MgO+CaO) ≤ 10 mol. %.

A still further example glass composition suitable for the glass substrate 100, which may optionally be strengthened or strong, comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % ≤ $(Li_2O+Na_2O+K_2O)$ ≤ 18 mol. % and 2 mol. % ≤ (MgO+CaO) ≤ 7 mol. %.

In a particular embodiment, an alkali aluminosilicate glass composition suitable for the glass substrate 100, which may optionally be strengthened or strong, comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In still another embodiment, the glass substrate, which may optionally be strengthened or strong, may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % ≤ $SiO_2+B_2O_3+CaO$ ≤ 69 mol. %; $Na_2O+K_2O+B_2O_3+MgO+CaO+SrO$ > 10 mol. %; 5 mol. % ≤ MgO+CaO+SrO ≤ 8 mol. %; $(Na_2O+B_2O_3)-Al_2O_3$ ≤ 2 mol. %; 2 mol. % ≤ $Na_2O-Al_2O_3$ ≤ 6 mol. %; and 4 mol. % ≤ $(Na_2O+K_2O)-Al_2O_3$ ≤ 10 mol. %.

In some embodiments, the glass substrate 100, which may optionally be strengthened or strong, may comprise an alkali silicate glass composition comprising: 2 mol % or more of $Al_2O_3$ and/or $ZrO_2$, or 4 mol % or more of $Al_2O_3$ and/or $ZrO_2$.

In some embodiments, the glass substrate used in the glass substrate 120 may be batched with 0-2 mol % of at least one fining agent selected from a group that includes $Na_2SO_4$, NaCl, NaF, NaBr, $K_2SO_4$, KCl, KF, KBr, and $SnO_2$.

Optionally, the substrate 100 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 100 according to one or more embodiments can have a thickness ranging from about 50 μm to 5 mm. Example substrate 100 thicknesses range from 100 μm to 500 μm, e.g., 100, 200, 300, 400 or 500 μm. Further example substrate 100 thicknesses range from 500 μm to 1000 μm, e.g., 500, 600, 700, 800, 900 or 1000 μm. The substrate 100 may have a thickness greater than 1 mm, e.g., about 2, 3, 4, or 5 mm. In one or more specific embodiments, the substrate 100 may have a thickness of 2 mm or less or less than 1 mm. The substrate 100 may be acid polished or otherwise treated to remove or reduce the effect of surface flaws.

Patterned Coating

As used herein, the term "patterned" includes coating that is discontinuous, has a varying thickness, includes mixtures of phases, includes mixtures of composition, includes regions having different toughnesses from one another, and/or includes regions having different elastic modulus values from one another. In the embodiment shown in FIG. 1, the patterned coating is shown as being discontinuous and including a first region 210 and a second region 220. The structure of the patterned coating 200 shown in FIG. 1 can be characterized as a series of discrete or nearly-discrete "islands" or "peaks" having lateral dimensions (excluding thickness) in the range from about 100 nm to about 100 μm. In one or more embodiments, the peaks have lateral dimensions (excluding thickness) of less than about 1 mm. The space between the peaks (or "valleys") may be bare (without any coating) or may have a small amount of coating.

In one embodiment, the first region 210 includes a lower tensile stress than the tensile stress of the second region 220. This tensile stress may be present under different loading conditions, such as ring-on-ring loading, which are not particularly limited. In one or more embodiments, the first region 210 has a tensile stress in the range from about 5 MPa to about 1000 MPa. The first region 210 may have a tensile stress in the range from about 5 MPa to about 900 MPa, about 5 MPa to about 800 MPa, about 5 MPa to about 700 MPa, about 5 MPa to about 600 MPa, about 5 MPa to about 500 MPa, about 5 MPa to about 400 MPa, about 5 MPa to about 300 MPa, about 5 MPa to about 200 MPa, about 10 MPa to about 1000 MPa, about 50 MPa to about 1000 MPa, about 100 MPa to about 1000 MPa, about 150 MPa to about 1000 MPa, about 200 MPa to about 1000 MPa, about 300 MPa to about 1000 MPa, about 50 MPa to about 500 MPa, about 50 MPa to about 400 MPa, about 50 MPa to about 300 MPa, about 100 MPa to about 500 MPa, about 500 MPa to about 1000 MPa, about 800 MPa to about 1000 MPa, and all ranges and sub-ranges therebetween. In one or more embodiments, the second region 220 has a tensile stress in the range from about 500 MPa to about 4000 MPa, from about 500 MPa to about 3500 MPa, from about 500 MPa to about 3000 MPa, from about 500 MPa to about 2500 MPa, from about 500 MPa to about 2000 MPa, from about 500 MPa to about 1500 MPa, from about 600 MPa to about 4000 MPa, from about 700 MPa to about 4000 MPa, from about 800 MPa to about 4000 MPa, from about 900 MPa to about 4000 MPa, from about 1000 MPa to about 4000 MPa, from about 1500 MPa to about 4000 MPa, from about 2000 MPa to about 4000 MPa, from about 3000 MPa to about 4000 MPa, from about 3500 MPa to about 4000 MPa, and all ranges and sub-ranges therebetween. The difference between the tensile stress of the first region 210 and the tensile stress of the second region 220 may be in the range from about 150 MPa to 900 MPa, about 1000 MPa or greater, or about 2000 MPa or greater.

The article 10 of one or more embodiments may exhibit a patterned structure such that, when a strain is applied to the article, the substrate 100 comprises a maximum substrate tensile strain and the patterned coating 200 has at least one local region comprising a local tensile strain that is less than the maximum substrate tensile strain. The at least one local region (that has a local tensile strain that is less than the maximum substrate tensile strain) may include the first region 210, or may also include a sub-portion of region 220. In some embodiments, the maximum substrate tensile strain may be in the range from about 0.5% to about 3%. In other embodiments, the local tensile strain may be about 2% or less, about 1.5% or less, about 1% or less, or about 0.5% or less.

The article 10 of one or more embodiments may exhibit a patterned structure such that, when a strain is applied to the article, the substrate 100 comprises a maximum substrate tensile stress and the patterned coating 200 has at least one local region comprising a local tensile stress that is less than the maximum substrate tensile stress. The at least one local region (that has a local tensile stress that is less than the maximum substrate tensile stress) may include the first region 210, or may also include a sub-portion of region 220.

In one or more embodiments, the patterned coating 200 may exhibit an elastic modulus ("coating elastic modulus") that has various relationships with the elastic modulus of the substrate ("substrate elastic modulus"). Exemplary patterned coatings 200 may have a coating elastic modulus measured in some portion of the pattern (for example, the thicker regions of the pattern) of at least 25 GPa and/or a hardness of at least 1.75 GPa, although some combinations outside of this range are possible. In some embodiments the patterned coating 200 may have a coating elastic modulus 50 GPa or greater or even 70 GPa or greater. For example, the coating elastic modulus may be 55 GPa, 60 GPa, 65 GPa, 75 GPa, 80 GPa, 85 GPa or more.

Figure 4:
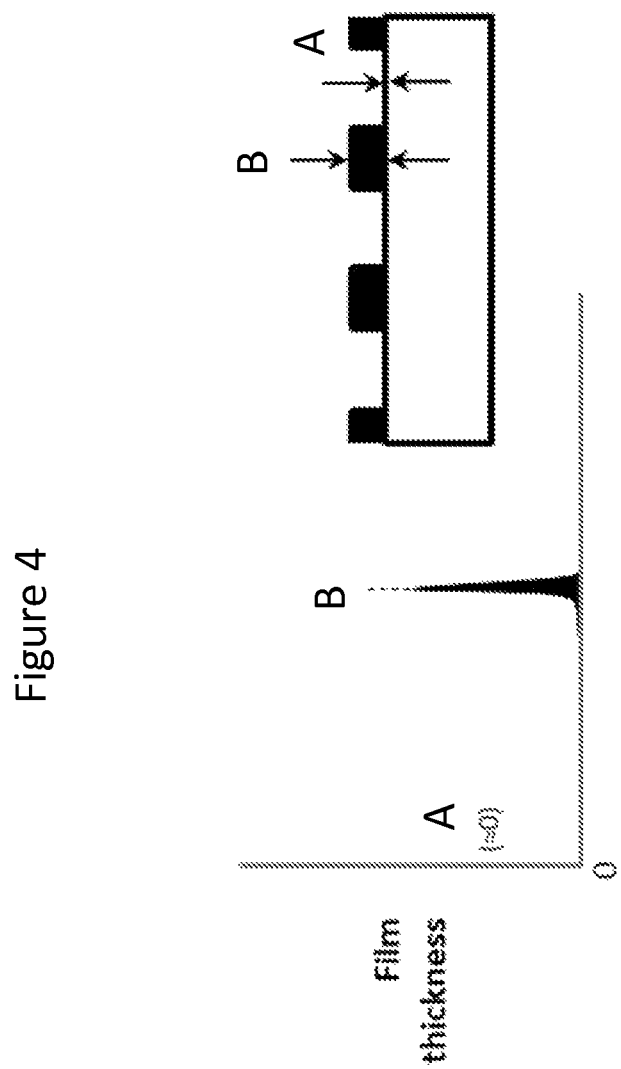
FIG. 4 is a side view illustration of an article according to one or more embodiments and a corresponding bimodal distribution of coating thickness.

The patterned coating 200 of one or more embodiments may include a bimodal distribution of coating thickness and corresponding surface topographical heights. FIG. 4 shows an exemplary bimodal distribution of coating thickness, where A indicates a lower-mode thickness and B indicates a higher-mode thickness. The bimodal distribution may include a lower-mode thickness in the range from about 0 nm to about 100 nm, and a higher-mode thickness in the range from about 50 nm to about 5000 nm.

In one or more embodiments, the lower-mode thickness may be in the range from about 0 nm to about 90 nm, from about 0 nm to about 80 nm, from about 0 nm to about 70 nm, from about 0 nm to about 60 nm, from about 0 nm to about 50 nm, from about 0 nm to about 40 nm, from about 0 nm to about 30 nm, from about 0 nm to about 20 nm, from about 0 nm to about 10 nm, from about 0 nm to about 5 nm, and all ranges and sub-ranges therebetween. In some embodiments, the higher-mode thickness may be in the range from about 50 nm to about 4000 nm, from about 50 nm to about 3000 nm, from about 50 nm to about 2000 nm, from about 50 nm to about 1500 nm, from about 50 nm to about 1000 nm, from about 50 nm to about 900 nm, from about 50 nm to about 800 nm, from about 50 nm to about 700 nm, from about 50 nm to about 600 nm, from about 50 nm to about 500 nm, from about 50 nm to about 400 nm, from about 50 nm to about 300 nm, from about 50 nm to about 200 nm and all ranges and sub-ranges therebetween.

Figure 5:
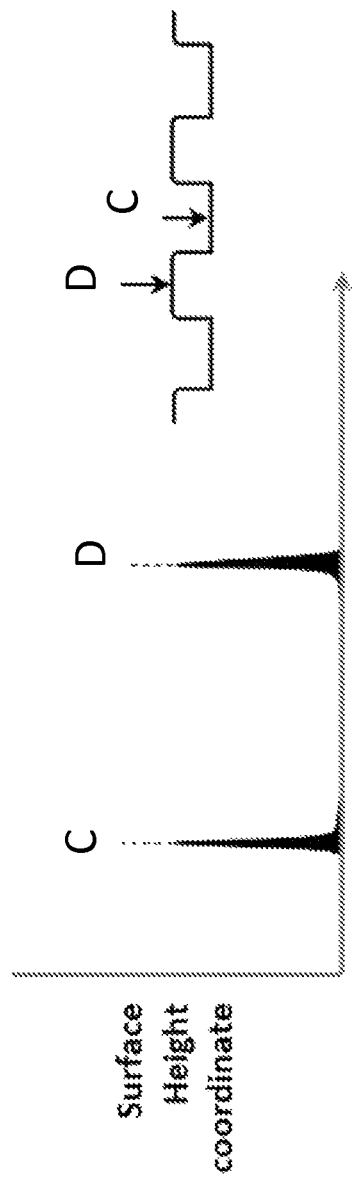
FIG. 5 is a side view illustration of an article according to one or more embodiments and a corresponding bimodal distribution of surface topography.

The patterned coating 200 may also exhibit a bimodal distribution of surface topography, as shown in FIG. 5, where C indicates a lower-mode height and D indicates a higher-mode height.

Figure 6:
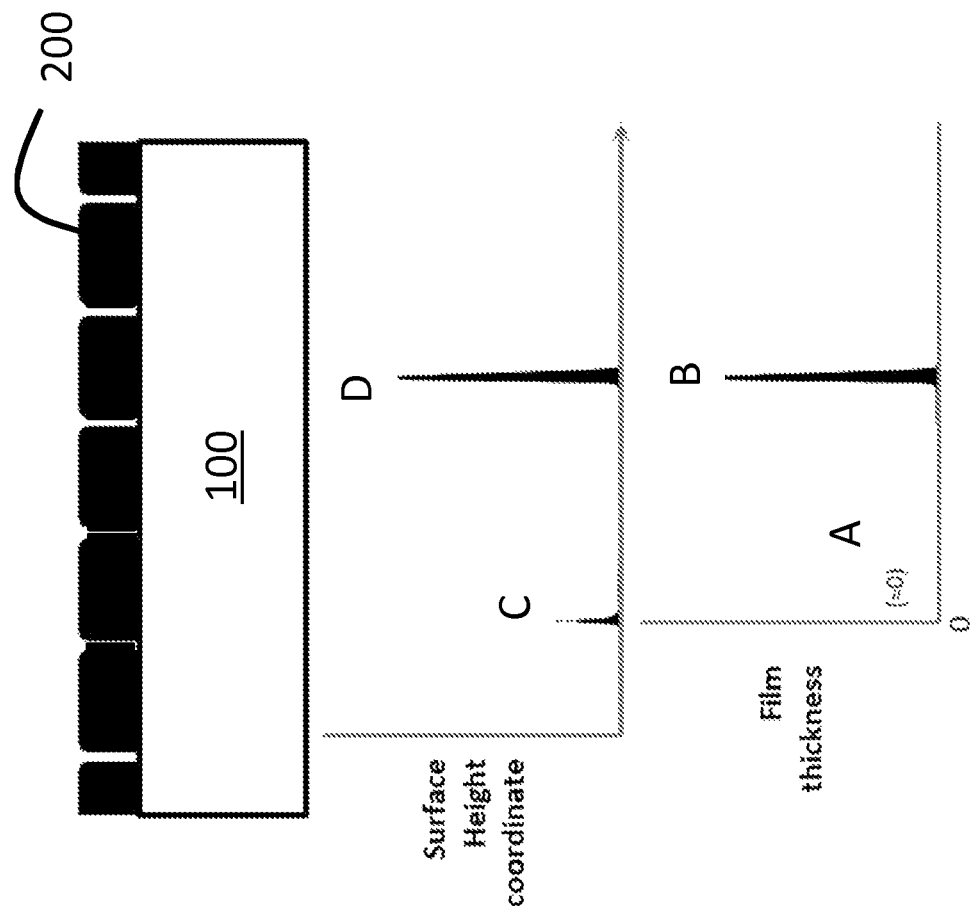
FIG. 6 is a side view illustration of an article according to one or more embodiments and a corresponding bimodal distributions of surface topography and film thickness.
Figure 7:
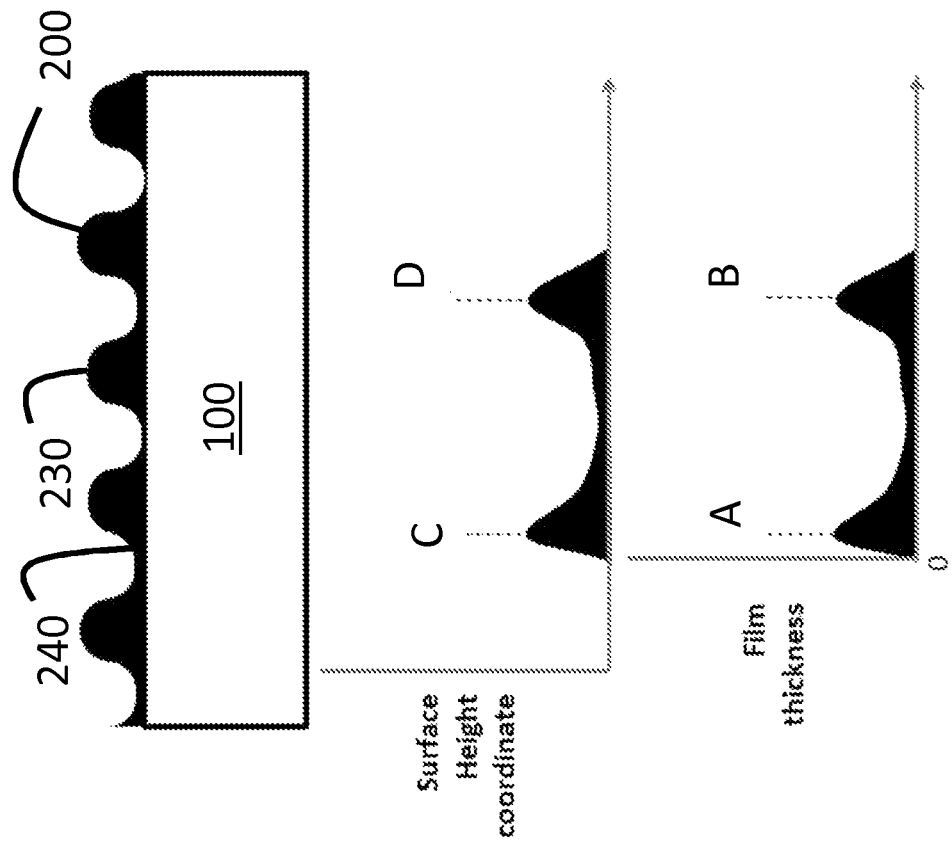
FIG. 7 is a side view illustration of an article according to one or more embodiments and a corresponding bimodal distributions of surface topography and film thickness.

The higher-mode thickness (or height) and the lower-mode thickness (or height) may have mode values about each and the distribution of thicknesses (or height) about each of the two central mode values (for the higher-mode thickness/topography and the lower-mode thickness/height)

can be sharp or broad. FIG. 6 illustrates a patterned coating having higher-mode thickness (B) and lower-mode thickness (A) with mode values, and distribution of thicknesses about each of the two central mode values that are sharp. FIG. 6 also illustrates a patterned coating having higher-mode thickness (B) and lower-mode thickness (A), wherein the amplitudes of the peaks in the thickness histogram are not equal, and equates to more of the surface area being represented by one coating-thickness-mode than the other. FIG. 6 further illustrates a patterned coating having higher-mode height (D) and lower-mode height (C) with mode values and distribution of topography about each of the two central mode values that are sharp. FIG. 6 also illustrates a patterned coating having higher-mode height (D) and lower-mode height (C), wherein the amplitude of the peaks in the surface height histogram are not equal, and equates to more of the surface area being represented by one surface-height-mode than the other. FIG. 7 illustrates a patterned coating having higher-mode thickness (B) and lower-mode thickness (A) with mode values and distribution of thicknesses about each of the two central mode values that are broad. FIG. 7 also illustrates a patterned coating having higher-mode thickness (B) and lower-mode thickness (A) wherein the distribution of thicknesses about the mode values is asymmetric. FIG. 7 also illustrates a patterned coating having higher-mode height (D) and lower-mode height (C) with mode values and distribution of height about each of the two central mode values that are broad. FIG. 7 also illustrates a patterned coating having higher-mode height (D) and lower-mode height (C) wherein the distribution of heights about the mode values is asymmetric. The patterned coating of some embodiments may also have other characteristics. For example, the patterned coating may exhibit a peak representing the higher-height mode that can be broad, asymmetric, and tall (i.e., having a higher amplitude), while the peak representing the lower-height mode can be sharp, symmetric, and short (i.e., lower amplitude). The characteristics of one mode by these metrics may be independent of the other As used herein, the terms "sharp" and "broad" may be quantified in terms of full-width-at-half-maximum (FWHM) for each of the lower-mode distribution and the higher-mode distribution. A "sharp" distribution about the modal thickness/height may include a FWHM of about 10 nm, or less or even 1 nm or less. A "broad" distribution may include a FWHM greater than the FWHM of the sharp distribution. In one or more embodiments, the FWHM of a broad distribution may be less than the difference in height between the modes. The difference between the FWHM of the higher-mode thickness and the FWHM of the lower-mode thickness may be less than the difference in the surface topographical heights of the lower mode thickness and the higher mode thickness.

In embodiments, the stress concentrations (defined herein as stress intensity factor at crack tips) may be reduced at certain local regions of the patterned coating. These local reduction(s) in stress concentrations may be caused by or correlated with a locally reduced coating thickness, a locally reduced coating modulus, a locally reduced coating stress, or a locally reduced coating strain.

In one or more embodiments, the article may include a surface coverage of the patterned coating. In one example, the surface coverage of patterned coating covering the substrate may be in the range from about 1% to about 99% of the surface area of the substrate. In some embodiments, the surface coverage may be in the range from about 10% to about 99%, from about 20% to about 99%, from about 30% to about 99%, from about 10% to about 90%, from about 10% to about 80%, from about 10% to about 70%, from about 10% to about 75%, from about 10% to about 60% and all ranges and sub-ranges therebetween.

In some embodiments, the patterned coating 200 includes a plurality of peaks and a plurality of valleys between the peaks. As shown in FIG. 7, the patterned coating may be continuous (but may exhibit other attributes making the coating "patterned" as defined herein), but may include a plurality of peaks 230 and a plurality of valleys 240. In one or more embodiments, the plurality of valleys may include a coating thickness of at least about 5 nm.

Figure 8:
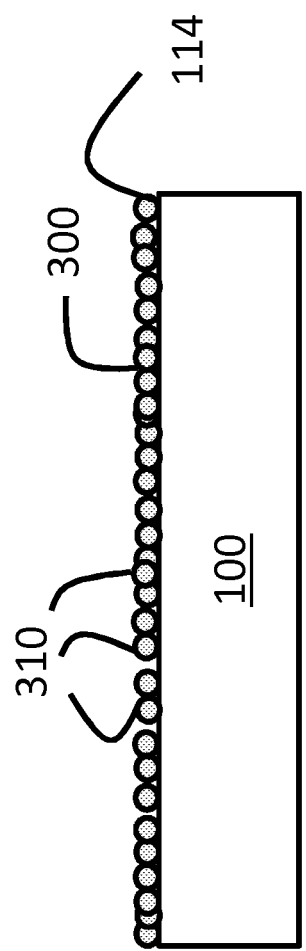
FIG. 8 is a side view illustration of an article according to one or more alternative embodiments.

In one or more embodiments, the article 10 includes a patterned coating 300 that includes a plurality of particles 310 disposed on at least one surface of the substrate (e.g., 112) as shown in FIG. 8. A patterned coating that includes such plurality of particles 310 may be referred to as a "particulate patterned coating". A patterned coating that is free of intentionally added particles may be referred to as a "non-particulate patterned coating". In one or more embodiments, the plurality of particles 310 may form a monolayer. In some embodiments the particles themselves form the discontinuities which comprise the pattern of the patterned coating 300. In one or more alternative embodiments, the plurality of particles 310 may not be ordered in layers and some particles may form stacking particles. In some embodiments, the plurality of particles 310 may be present as a bi-layer or multi-layer. In other embodiments the plurality of particles may form multiple layers, and in some cases there may be more layers of particles in local region 1 and less layers of particles in local region 2 (thus agglomerations or multiple layers of particles may be used to form the pattern of the patterned coating). In one or more embodiments, the plurality of particles 310 are disposed in a monolayer on the substrate surface 114, such that the adjacent particles are separated from each other by a gap. In such embodiments, the patterned coating 300 may provide anti-reflective properties. For example, the patterned coating exhibits a reflectance of less than about 2%, less than about 1.5%, or less than about 1%, at wavelengths in a range from about 450 nm to about 1000 nm. When the patterned coating 300 is combined with the substrate 100, the resulting article 10 may exhibit an average reflectance of less than about 7%, less than about 6.5%, less than about 6% or even less than about 5.5%, at wavelengths in a range from about 450 nm to about 1000 nm.

In one or more embodiments, the plurality of particles 310 includes silica particles or particles that include silica. In some embodiments, all of the plurality of particles are silica particles. Where the patterned coating 300 including a plurality of particles is utilized, the plurality of particles covers at least about 20% to about 75% of the surface area of the substrate surface 114 when projecting the diameter of the particles down onto the surface of the substrate (i.e. coverage area can equal projected or shadowed area, not necessarily physical contact area).

The compositions or material(s) of the patterned coating (200, 300) are not particularly limited. Some non-limiting examples of such materials include oxides such as $SiO_2$, $Al_2O_3$, $TiO_2$, $Nb_2O_5$, $Ta_2O_5$; oxynitrides such as $SiO_xN_y$, $SiAl_xO_yN_z$, and $AlO_xN_y$; nitrides such as $SiN_x$, $AlN_x$, cubic boron nitride, and $TiN_x$; carbides such as SiC, TiC, and WC; combinations of the above such as oxycarbides and oxy-carbo-nitrides (for example, $SiC_xO_y$ and $SiC_xO_yN_z$); semiconductor materials such as Si and Ge; transparent conductors (or transparent conductive oxides) such as indium-tin-oxide, tin oxide, fluorinated tin oxide, aluminum zinc oxide, or zinc oxide; carbon nanotube or graphene-doped oxides; silver or other metal-doped oxides, highly siliceous polymers such as highly cured siloxanes and silsesquioxanes; diamond or diamond-like-carbon materials; or selected metal films which can exhibit a fracture behavior.

In one or more embodiments, the patterned coating 200, 300 may include a plurality of layers. In one or more embodiments, each of the layers of the patterned coating may be characterized as brittle based on one or more of the layer's impact on the average flexural strength of the article and/or the layer's strain-to-failure, fracture toughness, or critical strain energy release rate values, as otherwise described herein. In one variant, the layers of the patterned coating 200 need not have identical properties such as elastic modulus and/or fracture toughness. In another variant, the layers of the patterned coating 200 may include different materials from one another.

The patterned coating 200, 300 can be disposed on the substrate 100 various method known in the art, for example, by vacuum deposition techniques, for example, chemical vapor deposition (e.g., plasma enhanced chemical vapor deposition, atmospheric pressure chemical vapor deposition, or plasma-enhanced atmospheric pressure chemical vapor deposition), physical vapor deposition (e.g., reactive or nonreactive sputtering or laser ablation), thermal, resistive, or e-beam evaporation, or atomic layer deposition. As will be described in greater detail below, such processes can be optimized to provide the patterned feature of the patterned coating. The patterned coating 200, 300 may also be disposed on one or more surfaces (e.g., 112, 114 of FIG. 1) of the substrate 100 using liquid-based techniques, for example sol-gel coating or polymer coating methods, for example spin, spray, slot draw, slide, wire-wound rod, blade/knife, air knife, curtain, gravure, and roller coating among others. In some embodiments it may be desirable to use adhesion promoters, such as silane-based materials, between the patterned coating 200, 300 and the substrate 100, and/or between the layers (if any) of the patterned coating 200, 300. In one or more alternative embodiments, the patterned coating 200, 300 may be disposed on the substrate 100 as a transfer layer.

The patterned coating 200, 300 may also serve multiple functions, or be integrated with additional film(s) or layers as described herein that serve other functions than the patterned coating 200 or even the same function(s) as the patterned coating. The patterned coating may include UV or IR light reflecting or absorbing layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers, and the like. Further, the patterned coating 200, 300 may include conducting or semi-conducting layers, thin film transistor layers, EMI shielding layers, breakage sensors, alarm sensors, electrochromic materials, photochromic materials, touch sensing layers, or information display layers. The patterned coating 200, 300 and/or any of the foregoing layers may include colorants or tint. When information display layers are integrated into the article 10, the article 10 may form part of a touch-sensitive display, a transparent display, or a heads-up display. It may be desirable that the patterned coating performs an interference function, which selectively transmits, reflects, or absorbs different wavelengths or colors of light. For example, the patterned coating 200, 300 may selectively reflect a targeted wavelength in a heads-up display application.

Functional properties of the patterned coating 200, 300 may include optical properties, electrical properties and/or mechanical properties, such as hardness, elastic modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties are substantially maintained or even improved after the patterned coating 200, 300 is combined with the substrate 100 and/or other films included in the article 10.

The articles 10 described herein have scratch resistance, which may be characterized by a measured hardness of the article (or the measured hardness of the patterned coating, as described herein). Hardness may be measured by a "Berkovich Indenter Hardness Test", which includes measuring the hardness of a material on a surface thereof by indenting the surface with a diamond Berkovich indenter. The Berkovich Indenter Hardness Test includes indenting the coated surface of the article or the surface of the patterned coating with the diamond Berkovich indenter to form an indent to an indentation depth in the range from about 50 nm to about 1000 nm (or the entire thickness of the patterned coating, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. The indentation depth is made and measured from the coated surface of the article, the surface of the patterned coating and/or surface of any one or more of the layers/particles that comprise the patterned coating. As used herein, hardness refers to a maximum hardness, and not an average hardness.

Typically in nanoindentation measurement methods (such as by using a Berkovich indenter) of a coating or film that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the patterned coating and layers/particles thereof, described herein, without the effect of the underlying substrate. When measuring hardness of the patterned coating or layers/particles thereof (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the patterned coating thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 100 nm, or less than about 70 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the patterned coating thickness.

It has been observed that the hardness measured at intermediate indentation depths (at which hardness approaches and is maintained at maximum levels) and at deeper indentation depths depends on the thickness of a material or layer.

In some embodiments, the article, the patterned coating and/or layer(s)/particles in the patterned coating exhibit a maximum hardness at indentation depths greater than about 100 nm or greater than about 200 nm and thus exhibit sufficient hardness to provide scratch resistance, that is not influenced by the substrate. In some embodiments, the article, the patterned coating and/or layer(s)/particles in the patterned coating have a maximum hardness at such indentation depths and thus are resistant to specific scratches such as microductile scratches (which typically have depths of about 100 nm to about 500 nm or from about 200 nm to about 400 nm). For example, the coated surface (or the surface of the patterned) may be resistant to microductile scratches because the article exhibits the hardness values recited herein along specific indentation depths, as measured by a Berkovich Indenter Hardness Test.

The measured or apparent hardness of, the article, the patterned coating and/or layer(s)/particles in the patterned coating may be maximized by tuning the thickness of the patterned coating or one or more layer(s)/particles in the patterned coating.

In one or more embodiments, the patterned coating may exhibit scratch resistance and may have a hardness greater than 3.0 GPa, measured by a Berkovich Indenter Hardness Test, as described herein, along an indentation depth of about 100 nm or greater (e.g., from about 100 nm to about 300 nm, from about 100 nm to about 400 nm, from about 100 nm to about 500 nm, or from about 100 nm to about 600 nm). For example, the patterned coating may have a hardness of 5 GPa, 5.5 GPa, 6 GPa, 6.5 GPa, 7 GPa, 7.5 GPa, 8 GPa, 8.5 GPa, 9 GPa, 9.5 GPa, 10 GPa or greater, 12 GPa or greater, 14 GPa or greater, or even 15 GPa or greater, as measured by a Berkovich Indenter Hardness Test, as described herein, along an indentation depth of about 100 nm or greater (e.g., from about 100 nm to about 300 nm, from about 100 nm to about 400 nm, from about 100 nm to about 500 nm, or from about 100 nm to about 600 nm). In some examples, the patterned coating may have a hardness of about 18 GPa or greater, 20 GPa or greater, or even 22 GPa or greater, as measured by a Berkovich Indenter Hardness Test, as described herein, along an indentation depth of about 100 nm or greater (e.g., from about 100 nm to about 300 nm, from about 100 nm to about 400 nm, from about 100 nm to about 500 nm, or from about 100 nm to about 600 nm).

In one or more embodiments, such patterned coatings 200, 300, when combined with the substrate 100 to form the article 10, exhibits in at least one region of its surface a scratch depth reduction of at least 10% and a scratch width reduction of at least 10% when compared to the substrate 100 (similarly tested) without the patterned coating.

In one or more embodiments, article 10 also exhibits abrasion resistance. Specifically, one or more embodiments of the articles described herein exhibit resistance to scratches and other damage formed by abrasion (or multiple contact events). Various forms of abrasion test are known in the art, such as that specified in ASTM D1044-99, using abrasive media supplied by Taber Industries. Modified abrasion methods related to ASTM D1044-99 can be created using different types of abrading media, abradant geometry and motion, pressure, etc. in order to provide repeatable and measurable abrasion or wear tracks to meaningfully differentiate the abrasion resistance of different samples. For example, different test conditions will usually be appropriate for soft plastics vs. hard inorganic test samples. The embodiments described herein exhibit small scratch resistance as measured by a specific modified version of the ASTM D1044-99 test referred to herein as the "Taber Test", or a "Garnet Test", which provide clear and repeatable differentiation of durability between different samples, which comprise primarily hard inorganic materials. These test methods may generate a combination of micro-ductile scratches together with other damage modes mentioned above, depending on the specific sample tested.

As used herein, the phrase "Taber Test" refers to a test method using a Taber Linear Abraser 5750 (TLA 5750) and accessories supplied by Taber Industries, in an environment including a temperature of about 22° C.±3° C. and Relative Humidity of up to about 70%. The TLA 5750 includes a CS-17 abraser material having a 6.7 mm diameter abraser head. Each sample was abraded according to the Taber Test and the abrasive damage was evaluated using both Haze and Bidirectional Transmittance Distribution Function (BTDF) measurements, among other methods. In the Taber Test, the procedure for abrading each sample includes placing the TLA 5750 and a flat sample support on a rigid, flat surface and securing the TLA 5750 and the sample support to the surface. Before each sample is abraded under the Taber Test, the abraser material (CS-17) is refaced using a new S-14 refacing strip adhered to glass. The abraser is subjected to 10 refacing cycles using a cycle speed of 25 cycles/minute and stroke length of 1 inch, with no additional weight added (i.e., a total weight of about 350 g is used during refacing, which is the combined weight of the spindle and collet holding the abraser). The procedure then includes operating the TLA 5750 to abrade the sample, where the sample is placed in the sample support in contact with the abraser head and supporting the weight applied to the abraser head, using a cycle speed of 25 cycles/minute, and a stroke length of 1 inch, and a weight such that the total weight applied to the sample is 850 g (i.e., a 500 g auxiliary weight is applied in addition to the 350 g combined weight of the spindle and collet). The procedure includes forming two wear tracks on each sample for repeatability, and abrading each sample for 500 cycle counts in each of the two wear tracks on each sample.

In one or more embodiments, the coated surface of the article is abraded according to the above Taber Test and the article exhibits a haze of about 5% or less, as measured on the abraded side using a hazemeter supplied by BYK Gardner under the trademark Haze-Gard Plus®, using an aperture over the source port, the aperture having a diameter of 8 mm.

In some embodiments, the haze measured after the Taber Test may be about 4% or less, about 3% or less, about 2% or less, about 1% or less, about 0.8% or less, about 0.5% or less, about 0.4% or less, about 0.3%, about 0.2% or less, or about 0.1% or less.

In one or more embodiments, the coated surface of the article 10 may exhibit an abrasion resistance, after being abraded by the Taber Test as measured by a light scattering measurement. In one or more embodiments, the light scattering measurement includes a bi-directional reflectance distribution function (BRDF) or bi-directional transmittance distribution function (BTDF) measurement carried out using a Radiant Zemax IS-SA™ instrument. This instrument has the flexibility to measure light scattering using any input angle from normal to about 85 degrees incidence in reflection, and from normal to about 85 degrees incidence in transmission, while also capturing all scattered light output in either reflection or transmission into 2*Pi steradians (a full hemisphere in reflection or transmission). In one embodiment, the article 100 exhibits an abrasion resistance, as measured using BTDF at normal incidence and analyzing the transmitted scattered light at a selected angular range, for example from about 10° to about 80° degrees in polar angles and any angular range therein. The full azimuthal range of angles can be analyzed and integrated, or particular azimuthal angular slices can be selected, for example from about 0° and 90° azimuthally. In the case of linear abrasion an azimuthal direction that is substantially orthogonal to the abrasion direction may be utilized so as to increase signal-to-noise of the optical scattering measurement. In one or more embodiments, the article may exhibit a scattered light intensity after the Taber Test as measured at the coated surface 101, of about less than about 0.1, about 0.05 or less, about 0.03 or less, about 0.02 or less, about 0.01 or less, about 0.005 or less, or about 0.003 or less (in units of 1/steradian), when using the Radiant Zemax IS-SA tool in CCBTDF mode at normal incidence in transmission, with a 2 mm aperture and a monochrometer set to 600 nm wavelength, and when evaluated at polar scattering angles in the range from about 15° to about 60° (e.g. specifically, about 20°). Normal incidence in transmission may be otherwise known as zero degrees in transmission, which may be denoted as 180° incidence by the instrument software. In one or more embodiments, the scattered light intensity may be measured along an azimuthal direction substantially orthogonal to the abraded direction of a sample abraded by the Taber Test. These optical intensity values may also correspond to less than about 1%, less than about 0.5%, less than about 0.2%, or less than about 0.1% of the input light intensity that is scattered into polar scattering angles greater than about 5 degrees, greater than about 10 degrees, greater than about 30 degrees, or greater than about 45 degrees.

Generally speaking, BTDF testing at normal incidence, as described herein, is closely related to the transmission haze measurement, in that both are measuring the amount of light that is scattered in transmission through a sample (or, in this case the article, after abrading the coated surface 101). BTDF measurements provide more sensitivity as well as more detailed angular information, compared to haze measurements. BTDF allows measurement of scattering into different polar and azimuthal angles, for example allowing us to selectively evaluate the scattering into azimuthal angles that are substantially orthogonal to the abrasion direction in the linear Taber test (these are the angles where light scattering from linear abrasion is the highest). Transmission haze is essentially the integration of all scattered light measured by normal incidence BTDF into the entire hemisphere of polar angles greater than about +/−2.5 degrees.

The Garnet Test uses the same apparatus as the Taber Test (i.e., a Taber linear abraser, or an equivalent apparatus). The Garnet Test includes using a 150-grit garnet sandpaper to abrade the sample surface under varying applied loads for one reciprocation cycle (i.e., one forward-and-back cycle), with a stroke length of 1" and a speed of 45 cycles/minute. The loads applied are in terms of a total load (including the weight of the abraser spindle, holder, and any added weights). The garnet sandpaper has a contact area with the samples of about 7 mm, similar to the Taber test. The Garnet Test performed in this way is generally more aggressive than the Taber Test and can produce a wider variety of damage modes. The visible scratches and damage are also more random. Light scattering from these samples can be characterized using BTDF and Haze measurements as described above.

In one or more embodiments, the article exhibits a haze of about 3% or less (e.g., about 2% or less, about 1% or less, about 0.5% or less, or about 0.2% or less) after the Garnet Test, when tested in the Garnet Test with a total load in the range from about 380 g to about 2100 g. The articles of one or more embodiment exhibit a scattered light level at a polar angle of 20 degrees (orthogonal to abrasion axis, as measured by CC-BTDF) of about 0.04 or less, about 0.02 or less, about 0.01 or less, or even about 0.005 or less, in units of 1/steradian.

In one or more embodiments, the when a strain is applied to the article, the crack onset strain of the patterned coating 200, 300 is greater than about 0.5%, greater than about 0.7%/a, or greater than about 0.9%, and all ranges and sub-ranges therebetween. In one or more embodiments, the crack onset strain for the patterned coating 200, 300 within one local region of the patterned coating may be less than 0.5%, but the strain level required to propagate a crack from one local region to another similar local region of the patterned coating (e.g., between two separate regions 220 that are separated by a region 210 in FIG. 1) may be greater than 0.5%, greater than 0.7%, or greater than 0.9%. In one or more embodiments, the strain required to grow or elongate a crack in the lateral direction (any direction in the x-y plane, generally parallel to the surface of the substrate) by a distance greater than about 1.0 mm is greater than about 0.5%. In one or more embodiments, the catastrophic failure strain of the entire coated article 10 is greater than about 0.5%, greater than about 0.7%, or greater than about 0.9%, and all ranges and sub-ranges therebetween. In one or more embodiments, the crack onset strain of the coating may be defined as the strain level required to grow or elongate a crack within the coating in any direction.

A second aspect of this disclosure pertains to a method of forming the articles described herein. In one or more embodiments, the method includes providing a substrate having a first major surface (as described herein), and selectively disposing a coating on the first major surface to form the patterned coatings described herein, which include a bimodal distribution of coating thickness and corresponding surface topographical heights. In one or more embodiments, the selectively disposing the coating can include disposing a mask having at least one opening on the first major surface, and selectively disposing the coating on the mask. In another embodiment, selectively disposing the coating includes disposing the coating on a surface of the substrate and removing portions of the coating. Removal of portions of the coating may be achieved through etching or other known mechanical and/or chemical removal means. In one or more embodiments, the bimodal distribution of coating thickness and corresponding surface topographical heights reduces the stress accumulation in the patterned coating, when a strain is applied to the article.

EXAMPLES

Various embodiments will be further clarified by the following examples.

Example 1

Examples 1A-1D included sixty samples that were formed by providing sixty alkali aluminosilicate glass substrates with a composition including at least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO and/or ZnO, wherein 0 mol %≤MgO≤6 and 0≤ZnO≤6 mol %; wherein 0 mol %≤CaO+SrO+BaO≤2 mol %. The substrates had dimensions of about 50.8×50.8×1.0 mm and included a first major surface. The substrates were chemically strengthened and exhibited a surface compressive stress of about 940 MPa and a depth of compressive stress layer (DOL) of about 40 μm.

The substrates of Example 1A and Example 1B were experimental controls. Fifteen substrates were not handled or subjected to any additional processing or treatment (Example 1A). Fifteen substrates (Example 1B) were handled in the same manner as Examples 1C and 1D (i.e., the samples were set on the platen and the copper shadow masks were taped down and then removed without receiving a coating, as described herein) and were subjected to the same annealing processes as Examples 1C and 1D. No coating was applied to Example 1B. Examples 1A and 1B were designed to evaluate the strength of the samples due to handling-related flaws that may or may not have been accumulated in the process of contacting the glass surface with the shadow mask, as well as general sample handling and heat-treatment.

The substrates of Example 1C were coated on the first major surface with a non-patterned coating and the substrates of Example 1D were coated on the first major surface with a patterned coating.

Figure 9B:
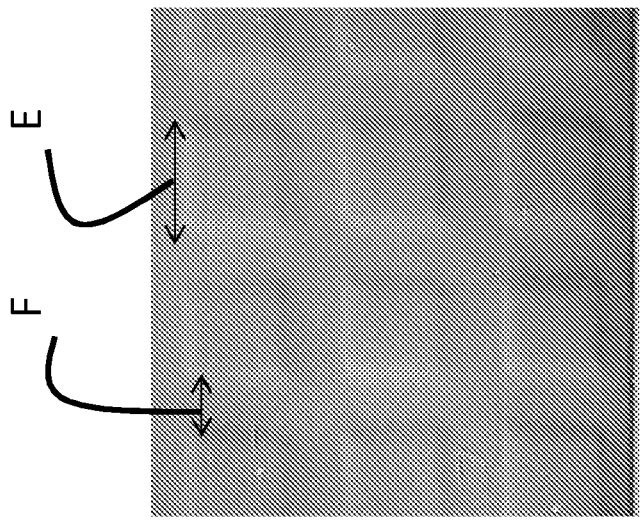
FIGS. 9A and 9B are microscope images of Example 1D.
Figure 9A:
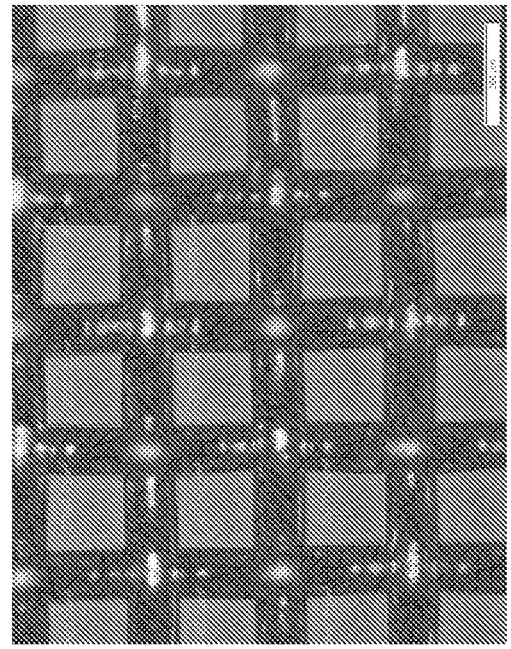

To form the patterned coating on Example 1D, a copper mesh 400 was applied to the substrates as a shadow mask, as shown in FIG. 9A. The copper wire mesh had a mesh size designation of 100×100, corresponding to open apertures in the mesh of approximately 0.006"×0.006", and was supplied by McMaster-Carr Supply Company. The copper wire mesh was used as a shadow mask for selective deposition of indium-tin-oxide coating materials onto the first major surface. FIG. 9A illustrates the copper mesh pattern, which included dimensional features having a length of about 150 μm to about 160 μm, as measured under microscope. The copper mesh included wires having a thickness of about 100 μm to about 110 μm. The total calculated open-area of the copper mesh was about 33%. The masks were pre-cleaned before being applied to the glass by ultrasonication in acetone, then isopropyl alcohol, and dried with nitrogen.

The patterned coating and the non-patterned coating included indium-tin-oxide (ITO). The ITO material was sputtered onto the bare substrate (in the case of Example 1C) or onto the substrate and copper mesh (in the case of Example 1D) to provide non-patterned coatings and patterned coatings having a thickness of about 85 nm using a standard unheated-substrate recipe in a KDF deposition system. For this process, each of the substrates of Examples 1C and 1D was placed on a metal platen with recessed slots designed to hold sixteen 50.8×50.8 mm samples in the film deposition chamber. Two separate deposition runs were performed, with each run containing a total of 15 samples. In each run, 8 out of the 15 total samples were selected at random and masked using the cleaned copper shadow masks (Kapton-taped at the corners) such that the resultant coating was patterned and the remaining 7 samples were left unmasked and received a non-patterned coating. All of the coated samples of Examples 1C and 1D were annealed at 200° C. for 1 hour following film deposition.

The patterned structure of the patterned coating of Example 1D was verified by differential-interference microscope inspection, as shown in FIG. 9B. The patterned coating included a first regions (or peaks) having dimensions (excluding thickness) "E" of about 150 μm to about 160 μm. The second regions (or valleys) between the peaks of the patterned coating have a lateral dimension "F" in the range from about 100 μm to about 110 μm. The patterned coating covered about 33% of the surface area of the substrate.

The strength of all samples were evaluated using a ring-on-ring (ROR) equibiaxial flexure test in a temperature and humidity-controlled room, in general accordance with ASTM Method C1499-09. Each of the samples was taped on the backside and loaded into the test apparatus in a configuration that puts the coated surface into tension. A 0.5" load ring on a 1" support ring geometry was used, where the load is increased at a controlled rate and the load-to-failure is recorded.

Figure 10:
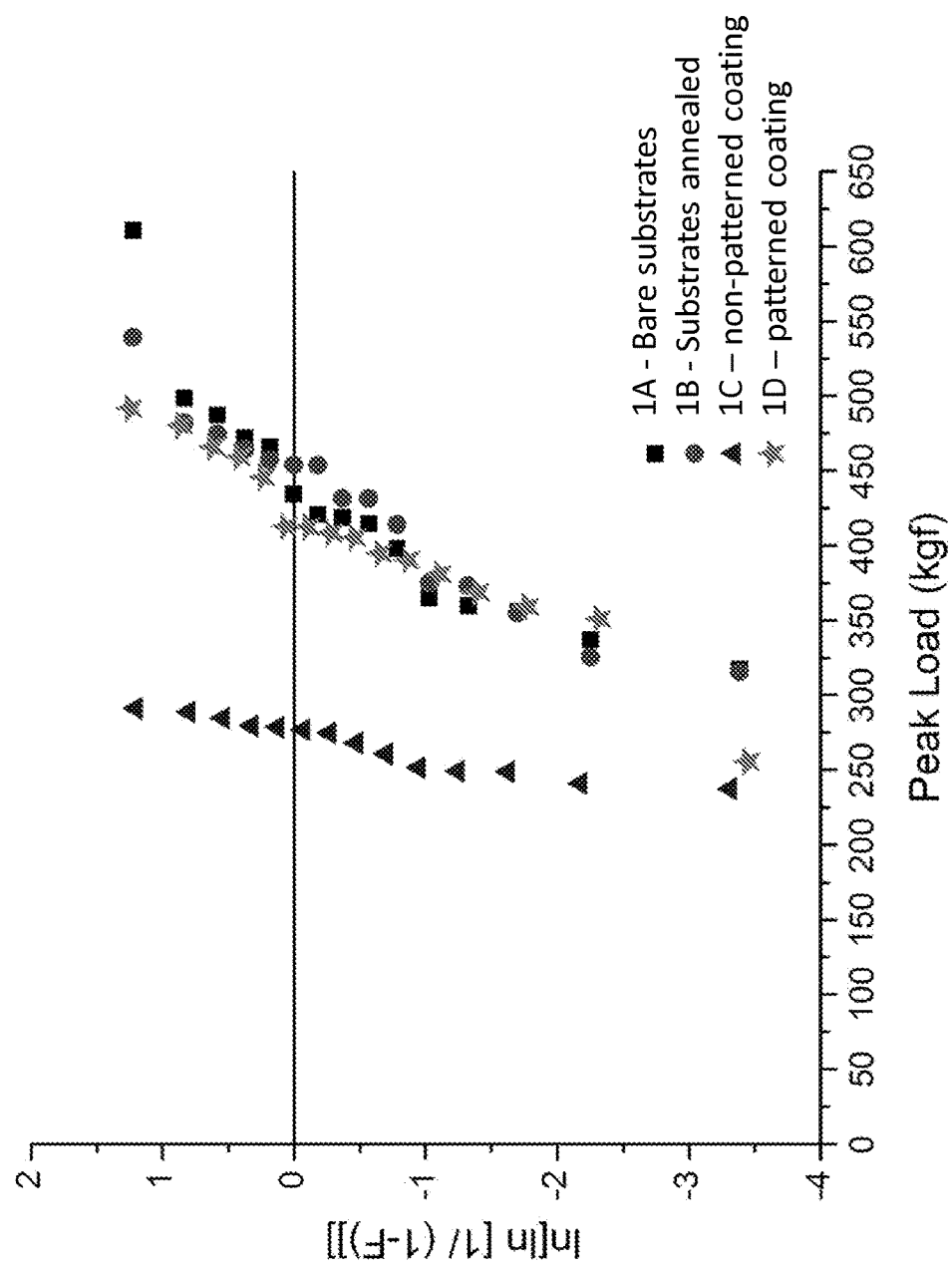
FIG. 10 is a Weibull plot of Examples 1A-1D.
Figure 11:
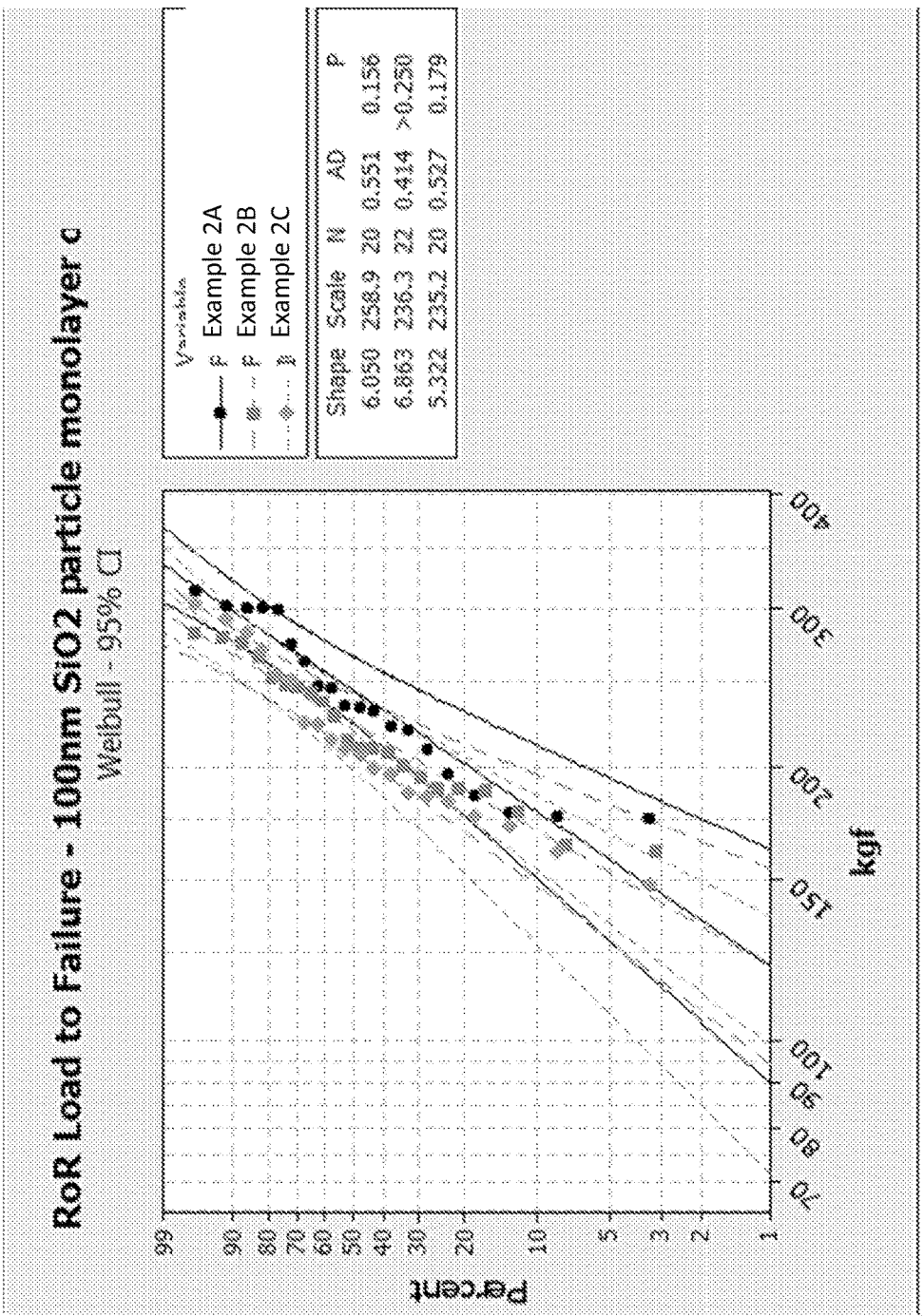
FIG. 11 is a Weibull plot of Examples 2A-2C.

A Weibull plot of load distributions from Examples 1A-1D is shown in FIG. 10. The samples of Example 1A show a characteristic failure load of 446 kgf, which establishes the baseline expectation of strength for the strengthened glass substrates. A nearly identical value was obtained for "handling" controls (i.e. Example 1B), indicating minimal effect of masking, sample handling, or heat-treatment on the ROR strength. Example 1C with a non-patterned ITO coating show the expected strength-loss effect by showing a characteristic failure load of 274 kgf (or a reduction of about 39% from Examples 1A and 1B). In contrast, Example 1D (with the patterned coating) showed the same failure load as Examples 1A and 1B. Specifically, the failure load was within 3% of the failure load of Examples 1A and 1B.

Example 2

Examples 2A-2C were formed by providing aluminosilicate glass substrates having dimensions of 2"×2" and a thickness of about 0.7 mm. The substrates had a composition including $SiO_2$, $Al_2O_3$, and $Na_2O$, wherein $SiO_2+B_2O_3 \geq 66$ mol %, $Al_2O_3 \geq 7$ mol %, $B_2O_3 \leq 6.27$ mol %, $Na_2O \geq 9$ mol %, $B_2O_3+Na_2O+K_2O+MgO+CaO \geq 18$ mol %, and CaO≤2 mol %. The substrates also had a first major surface and were chemically strengthened and exhibited a surface compressive stress of about 700 MPa and a depth of compressive stress layer (DOL) of about 40 μm.

Example 2A was coated with a plurality of silica particles (having a diameter of about 100 nm) on the first major surface and the resulting articles were fired in a furnace at about 600 C to adhere the particles to the first major surface. Example 2A was ion-exchange strengthened after application and firing of the particulate coating. Example 2B was first coated with an inorganic binder layer of sodium silicate having a thickness of about 10 nm on the first major surface and then coated with the same plurality of silica particles as Example 2A. Example 2B was ion-exchange strengthened before application of the binder and silica particles. After application of the binder and silica particles, the resulting articles were fired in a furnace at about 300 C to strengthen the adhesion of the particles and binder to the surface. Example 2C was left bare and not coated.

Each of Examples 2A-2C were tested using the same ring-on-ring (ROR) equibiaxial flexure test as used in Example 1. FIG. 10 shows the Weibull plot of failure load distributions from Examples 2A-2C. As illustrated in FIG. 10, Examples 2A and 2B had about the same failure load as Example 2C, demonstrating the strength retention of the patterned coatings of Examples 2A and 2B.

It will be apparent to those skilled in the art that various modifications and variations can be made without departing from the spirit or scope of the invention.

What is claimed is:

1. An article comprising:
a substrate including a surface;
a patterned coating disposed on the surface forming a coated surface,
wherein, when a strain is applied to the article, the article exhibits a failure strain of 0.5% or greater,
wherein the patterned coating comprises a bimodal distribution of coating thickness, the bimodal distribution comprising a lower-mode thickness in the range from 10 nm to 90 nm, and a higher-mode thickness in the range from about 50 to about 5000 nm, and
wherein the substrate surface has a surface area and the patterned coating covers at least about 20% of the surface area.

2. The article of claim 1, wherein, when a strain is applied to the article, the patterned coating has a first region and a second region, and wherein the first region comprises a first tensile stress and the second region comprises a second tensile stress greater than the first tensile stress.

3. The article of claim 1, wherein, when a strain is applied to the article, the substrate comprises a maximum substrate tensile stress and the patterned coating has at least one local region comprising a local tensile stress that is less than the maximum substrate tensile stress.

4. The article of claim 1, wherein, when a strain is applied to the article, the substrate comprises a maximum substrate tensile strain and the patterned coating has at least one local region comprising a local tensile strain that is less than the maximum substrate tensile strain.

5. The article of claim 1, wherein the patterned coating comprises a bimodal distribution of coating thickness, the bimodal distribution comprising a lower-mode thickness comprising a full-width-at half-maximum (FWHM) of about 1 nm or less and a higher-mode thickness comprising a FWHM greater than the FWHM of the lower-mode thickness.

6. The article of claim 5, wherein the FWHM of the higher-mode thickness is less than the difference in the surface topographical heights of the lower-mode thickness and the higher-mode thickness.

7. The article of claim 6, wherein the patterned coating comprises a plurality of peaks and a plurality of valleys between the peaks.

8. The article of claim 7, wherein the patterned coating at the plurality of valleys comprises a coating thickness of at least about 5 nm.

9. The article of claim 1, wherein the substrate exhibits an average strain-to-failure that is greater than an amount selected from 0.7%, 1.0%, 1.5%, 2%, 2.5% and 3%.

10. The article of claim 1, wherein the patterned coating comprises a hardness of 8 GPa or greater, as measured by a Berkovich Indenter Hardness Test along indentation depths of about 100 nm or greater.

11. A consumer electronic device comprising:
a substrate including a surface;
a patterned coating disposed on the surface,
wherein, when a strain is applied to the article, the crack onset strain of the patterned coating is greater than 0.5%,
wherein the patterned coating comprises a bimodal distribution of coating thickness, the bimodal distribution comprising a lower-mode thickness comprising a full-width-at half-maximum (FWHM) of about 1 nm or greater, and a higher-mode thickness comprising a FWHM greater than the FWHM of the lower-mode thickness, and
wherein the substrate surface has a surface area and the patterned coating covers at least about 20% of the surface area.

12. The consumer electronic device of claim 11, wherein the patterned coating comprises a hardness of 8 GPa or greater, as measured by a Berkovich Indenter Hardness Test along indentation depths of about 100 nm or greater.

13. The consumer electronic device of claim 11, wherein the FWHM of the higher-mode thickness is at most two times the difference in the surface topographical heights of the lower-mode thickness and the higher-mode thickness.

14. The consumer electronic device of claim 11, wherein the patterned coating comprises a plurality of peaks and a plurality of valleys between the peaks.

15. The consumer electronic device of claim 11, wherein the patterned coating comprises a bimodal distribution of coating thickness, the bimodal distribution comprising a lower-mode thickness in the range from about 0 to about 100 nm, and a higher-mode thickness in the range from about 200 to about 5000 nm.

* * * * *